United States Patent
Uematsu et al.

(10) Patent No.: US 6,769,867 B2
(45) Date of Patent: Aug. 3, 2004

(54) JOINT STRUCTURE OF COOLANT PASSAGE, TUBE SEAL, AND GAS TURBINE

(75) Inventors: Kazuo Uematsu, Takasago (JP); Takeaki Ohya, Takasago (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 40 days.

(21) Appl. No.: 10/237,018

(22) Filed: Sep. 9, 2002

(65) Prior Publication Data

US 2003/0049126 A1 Mar. 13, 2003

(30) Foreign Application Priority Data

Sep. 10, 2001 (JP) ......................................... 2001-274340

(51) Int. Cl.$^7$ ................................................. F01D 1/18
(52) U.S. Cl. ..................................... 415/115; 416/96 R
(58) Field of Search .......................... 415/115; 416/96 R

(56) References Cited

U.S. PATENT DOCUMENTS

| 3,370,830 | A | * | 2/1968 | Nickles et al. | ................. | 416/95 |
| 5,318,404 | A | * | 6/1994 | Carreno et al. | ............ | 416/96 R |
| 5,593,274 | A | * | 1/1997 | Carreno et al. | .............. | 415/115 |
| 5,971,707 | A | | 10/1999 | Uematsu et al. | | |
| 5,984,637 | A | | 11/1999 | Matsuo | | |
| 6,000,909 | A | * | 12/1999 | Hirokawa et al. | ........ | 416/96 R |

FOREIGN PATENT DOCUMENTS

| JP | 10-238301 | 9/1998 |
| JP | 11-22408 | 1/1999 |
| JP | 11-30102 | 2/1999 |
| JP | 2000-274261 | 10/2000 |

* cited by examiner

Primary Examiner—Edward K. Look
Assistant Examiner—Igor Kershteyn
(74) Attorney, Agent, or Firm—Oblon, Spivak, McClelland, Maier & Neustadt, P.C.

(57) ABSTRACT

A tube seal is fitted with a spherical spring, being an elastic member, at one end of a tubular barrel. The end where the spring is fitted to the tubular barrel is inserted into a steam supply pipe outlet, which is a coolant passage provided in a rotor disk. The other end of the barrel is formed into a spherical shape, and this end is inserted into a steam supply port in a dynamic blade, being another coolant passage port, and abuts against the internal surface of the steam supply port.

10 Claims, 8 Drawing Sheets

JOINT STRUCTURE OF COOLANT PASSAGE, TUBE SEAL, AND GAS TURBINE

BACKGROUND OF THE INVENTION

1) Field of the Invention

This invention relates to a gas turbine which uses a coolant such as air and steam for cooling a dynamic blade. More specifically, this invention relates to a joint structure of a coolant flow passage in the gas turbine for coupling a flow passage for supplying a coolant from a rotor disk to the dynamic blade, a tube seal and the gas turbine.

2) Description of the Related Art

In order to increase thermal efficiency in the gas turbine, a technique in which steam is used as a coolant instead of the air, to cool hot members such as a dynamic blade, a rotor disk or a stationary blade of the gas turbine is now being used. This is due to the following reasons. That is, the specific heat at constant pressure of dry steam is cp=1.86 kJ/kgK under a standard condition, which is a value almost twice as large as the specific heat at constant pressure of the air, cp=1.00 kJ/kgK. Therefore, the steam has a large heat capacity as compared with the air of the same mass, and the endothermic effect thereof increases. Further, if the wet steam is used as a coolant, latent heat of vaporization of the wet portion can be used for cooling, and hence the endothermic effect thereof further increases. Therefore, when the steam is used for the coolant, the cooling efficiency can be increased than using the air, and hence the temperature of the combustion gas at the entrance of the turbine can be set high. As a result, the thermal efficiency can be improved.

In the conventional air cooling, air from the compressor has been used as a coolant for the dynamic and stationary blades of the turbine. However, if this compressed air is used for cooling, the work that can be taken out from the turbine decreases. Here, if steam is used instead of the air, the cooling air for the dynamic and stationary blades can be saved, and hence the work that can be recovered by the turbine increases by this amount, thereby the work that can be taken out from the turbine can be increased.

FIG. 8 is a cross section which shows a steam flow passage for supplying cooling steam to the dynamic blade of the turbine. The steam supplied to the hollow main spindle 800 of the turbine is guided to a steam supply pipe 801 heading radially outwards. Thereafter, this steam flows into a steam supply pipe 804 which goes axially through the vicinity of the outer periphery of a rotor disk 803, and is supplied to a cooling flow passage (not shown) provided inside of the dynamic blade 805.

FIG. 9 is a cross section which shows a joint structure of the coolant passage, which has been conventionally used for supplying or recovering the cooling steam from the rotor disk side to the dynamic blade side. As shown in this figure, the end 121 of the joint section 120 is formed into a spherical shape, and fitted into a coolant passage inlet 805a of a dynamic blade 805, which is also formed into a spherical shape to fit in with the end. A protruding portion 120a is peripherally provided at the other end of the joint section 120. When the other end of the joint section 120 is inserted into the coolant passage outlet 803a on the rotor disk 803 side, the top of the protruding portion 120a and the coolant passage outlet 803a abut against each other, which becomes a seal point 125 to prevent leakage of the coolant.

In Japanese Patent Application Laid-Open No. 2000-274261, there is disclosed a joint structure of a cooling passage, wherein a flange is formed at one end of a joint section, and inserted into a groove having the same cross section as that of the flange, provided at the root of a dynamic blade, to thereby connect a coolant flow passage. A spherical spring is provided at a portion where this joint portion is inserted into a cooling flow passage outlet formed in a rotor disk, and leakage of steam is prevented by the elastic force of this spring.

The end 121 of the joint section 120 is spherical and comes into face contact with a coolant inlet 805a of the dynamic blade 805 formed into a spherical shape which fits in together with the end, to prevent the steam from leaking. However, it is difficult to increase the machining accuracy of the face, and steam leaks slightly from this portion. Further, during operation of the gas turbine, the temperature of the joint structure portion of the cooling flow passage increases up to about 400° C. Therefore, the joint section 120 is manufactured from a metal material, and inserted into the coolant passage outlet 803a of the rotor disk 803 manufactured from a metal material as well. Therefore, a gap is always formed at the seal point 125, causing a problem in that steam leaks from this gap. Since the amount of leakage of the steam is not so large, it is not a big problem so far. However, in order to increase the use efficiency of the steam, it is necessary to minimize the steam leakage in the seal portion.

The joint structure of a cooling passage disclosed in Japanese Unexamined Patent Publication No. 2000-274761 can correspond to the radial movement of the rotor disk. However, when a movement in the direction perpendicular to this radial direction occurs, if the movement is very small, this joint structure can correspond thereto, but if the movement is large, a gap is formed between the flange and the root of the dynamic blade, and hence causing a problem in that steam leaks from this gap.

SUMMARY OF THE INVENTION

It is an object of this invention to provide a joint structure of a cooling flow passage and a tube seal in a gas turbine, and a gas turbine, wherein wastage of steam is suppressed by reducing leakage of the steam, and even if the dynamic blade and the rotor disk move relative to each other, the seal performance can be maintained.

The joint structure of a coolant passage in a gas turbine according to one aspect of the present invention comprises a rotor disk having a first coolant passage port for supplying or recovering a coolant to or from a dynamic blade, the dynamic blade being fitted to the outer periphery of the rotor disk, a second coolant passage port provided at the root of the dynamic blade, and a tube seal having a tubular barrel, the end of the barrel inserted into the second coolant passage port being formed into a spherical shape, and the side of the barrel inserted into the first coolant passage port being provided with an elastic member which deforms in the radial direction of the barrel. The internal surface of the second coolant passage port and the spherical end of the tubular barrel come in line contact with each other.

Thus, the spherical end of the tube seal and the internal surface of the coolant passage port provided at the root of the dynamic blade into line contact with each other, to thereby suppress leakage of the coolant in this portion. At the coolant passage port on the rotor disk side, leakage of steam is suppressed by the spherical elastic member such as a spring provided on the tube seal barrel. Since the coolant passage port provided in the dynamic blade and the end of the tube seal barrel are brought into line contact with each other, leakage of the coolant can be suppressed, even if the machining accuracy in this portion is not so high. Further, in the coolant passage on the rotor disk side, the seal performance is maintained by the elastic member, and vibrations can be absorbed by a damping action of this elastic member. Therefore, stable sealing effect can be maintained not only on the rotor disk side but also in the coolant passage on the dynamic blade side.

Since the end of the tube seal barrel is formed into a spherical shape, it endures large centrifugal force acting thereon due to the rotation of the rotor disk, and the seal performance of this portion can be maintained. Even when the dynamic blade and the rotor disk shift from each other and the tube seal inclines, the seal performance can be maintained by the spherically formed end of the tube seal barrel and the elastic member provided on the tube seal barrel. At this time, since the shift of the dynamic blade is absorbed by the inclination of the tube seal, a larger shift can be absorbed than by a horizontal shift of the tube seal in the radial direction. By these actions, with this joint structure, the seal performance is maintained regardless of the operation condition, to suppress the amount of coolant such as steam or air leaking from the joint portion of the cooling flow passage. Therefore, the coolant is effectively used, and the thermal efficiency of the gas turbine can be also improved. The joint structure of the cooling flow passage is applicable to either a gas turbine using steam as the coolant or a gas turbine using air.

As the means for bringing line contact, there can be mentioned forming a spherical face having a larger curvature than that of the spherical end of the tube seal into a concave shape on the internal surface of the coolant passage port provided at the root of the dynamic blade, or forming the internal surface of the coolant passage port into a convex spherical shape, so that these abut against the spherical end of the tube seal. Further, a ring having an inner diameter smaller than the outer diameter of the spherical end of the tube seal may be provided between the end of the tube seal and the inside of the coolant passage provided at the root of the dynamic blade, to bring the inner periphery of the end of this ring and the spherical end of the tube seal into line contact with each other. Further, the inside of the coolant passage provided at the root of the dynamic blade may be formed step-wise, and the small diameter section thereof is made smaller than the outer diameter of the spherical end of the tube seal, to thereby bring the end of the tube seal and the small diameter section of the coolant passage into line contact with each other.

The joint structure of a coolant passage in a gas turbine according to another aspect of the present invention comprises a rotor disk having a first coolant passage port for supplying or recovering a coolant to or from a dynamic blade, the dynamic blade being fitted to the outer periphery of the rotor disk, a second coolant passage port provided at the root of the dynamic blade, the second coolant passage port having an internal surface that is conical such that it tapers towards the end of the dynamic blade, and a tube seal having a tubular barrel, the end of the barrel inserted into the second coolant passage port being formed into a spherical shape, and the side of the barrel inserted into the first coolant passage port being provided with an elastic member which deforms in the radial direction of the barrel.

Thus, the spherical end of the tube seal barrel to abut against the coolant passage port, whose inner surface provided in the dynamic blade being formed into a conical shape, to thereby suppress leakage of the coolant in this portion. At the coolant passage port on the rotor disk side, leakage of steam is suppressed by the spherical elastic member such as a spring provided on the tube seal barrel. Since the coolant passage port provided in the dynamic blade and the end of the tube seal barrel are brought into line contact with each other, leakage of the coolant can be suppressed, even if the machining accuracy in this portion is not so high. Further, since the coolant passage port provided at the root of the dynamic blade is formed into a conical shape, machining is easy, and much labor is not necessary for manufacturing.

The joint structure of a coolant passage in a gas turbine according to another aspect of the present invention comprises a rotor disk having a first coolant passage port for supplying or recovering a coolant to or from a dynamic blade, the dynamic blade being fitted to the outer periphery of the rotor disk, a second coolant passage port provided at the root of the dynamic blade, the second coolant passage port having an internal surface that is conical such that it tapers towards the end of the dynamic blade, and a tube seal having a tubular barrel, a working face being formed on the outer periphery of the end of the barrel inserted into the second coolant passage port, the side of the barrel inserted into the first coolant passage port being provided with an elastic member which deforms in the radial direction of the barrel, and a protruding portion which restricts a radial movement of the barrel, by abutting against at least one of the internal surfaces of the first and the second coolant passage ports, being provided on the side of the barrel.

The joint structure of the cooling flow passage suppresses leakage of the coolant by bringing the working face formed on the outer periphery of the end of the barrel to abut against the internal surface of the coolant passage port provided in the dynamic blade, whose inner face is formed into a conical shape. Further, leakage of the coolant in the coolant passage port provided in the rotor disk is suppressed by the elastic member. The radial movement of the tube seal is also restricted by the protruding portion provided in the tube seal barrel, to thereby prevent the elastic member from being damaged. This joint structure serves the function effectively, when the shift between the dynamic blade and the rotor disk is small. However, when the shift of the dynamic blade is large, the inclination of the tube seal increases, to cause leakage of the coolant in the end where the working face is formed. Therefore, it is desirable to apply this joint structure when the shift of the dynamic blade is small. In this tube seal, since it is not necessary to form the end thereof into a spherical shape, manufacture is easy, and the manufacturing cost can be reduced.

The working face formed on the outer periphery of the tube seal barrel includes one formed with a curved surface or one having a cut instead of the curved surface. Alternatively, this portion may be formed into a conical shape matched with the shape of the internal surface at the coolant passage port provided in the dynamic blade. However, the shape other than the curved surface will come in face contact with the internal surface of the coolant passage port provided in the dynamic blade, and hence it is desired to form the shape into a curved surface from the viewpoint of the seal performance.

In the tube seal according to still another aspect of the present invention, its end is formed into a spherical shape, and the side of the barrel inserted into a coolant passage port to be coupled is provided with an elastic member that deforms in the radial direction of the barrel. Since the end of this tube seal is formed into a spherical shape, even if a large force acts thereon in the axial direction of the tube seal, it can endure the force to maintain the seal performance. The seal performance can be also ensured by the elastic member that deforms in the radial direction of the barrel. Even when the tube seal is inclined, the seal performance can be maintained by the spherical end and the elastic member, and hence, the sealing effect can be exhibited even in a portion where the shift of the tube seal with respect to the radial direction is large.

The gas turbine according to still another aspect of the present invention comprises a compressor, a combustor, and the joint structure explained above.

In this gas turbine, the rotor disk and the dynamic blade are coupled by the joint structure of the cooling flow passage, to supply and recover the coolant to and from the dynamic blade. The dynamic blade and the rotor disk of the gas turbine reach high temperatures, and are exposed to a high centrifugal force, and hence the dynamic blade and the rotor disk may be shifted from each other due to thermal deformation, and a large force acts on the sealing structure. Since the joint structure applied to this gas turbine seals the coolant passage by bringing the tube seal, whose end being formed into a spherical shape, into line contact with the inner surface of the coolant passage, even if a high centrifugal force acts thereon, the sealing effect can be maintained. Further, even if the dynamic blade is shifted, the tube seal exhibits the sealing effect, while being inclined by the spherical end and the elastic member provided on the barrel of the tube seal, to absorb the shift. In this manner, even under high temperatures and under an environment where a high centrifugal force is acting, wastage of the coolant can be made as small as possible by the stable sealing effect, and the thermal efficiency of the gas turbine can be improved.

These and other objects, features and advantages of the present invention are specifically set forth in or will become apparent from the following detailed descriptions of the invention when read in conjunction with the accompanying drawings.

DETAILED DESCRIPTIONS

Embodiments of the present invention will be explained in detail below while referring to the accompanying drawings. It should be noted that this invention is not limited by those embodiments. The components in the following embodiments should include components that are easily assumed by those skilled in the art.

Figure 1:
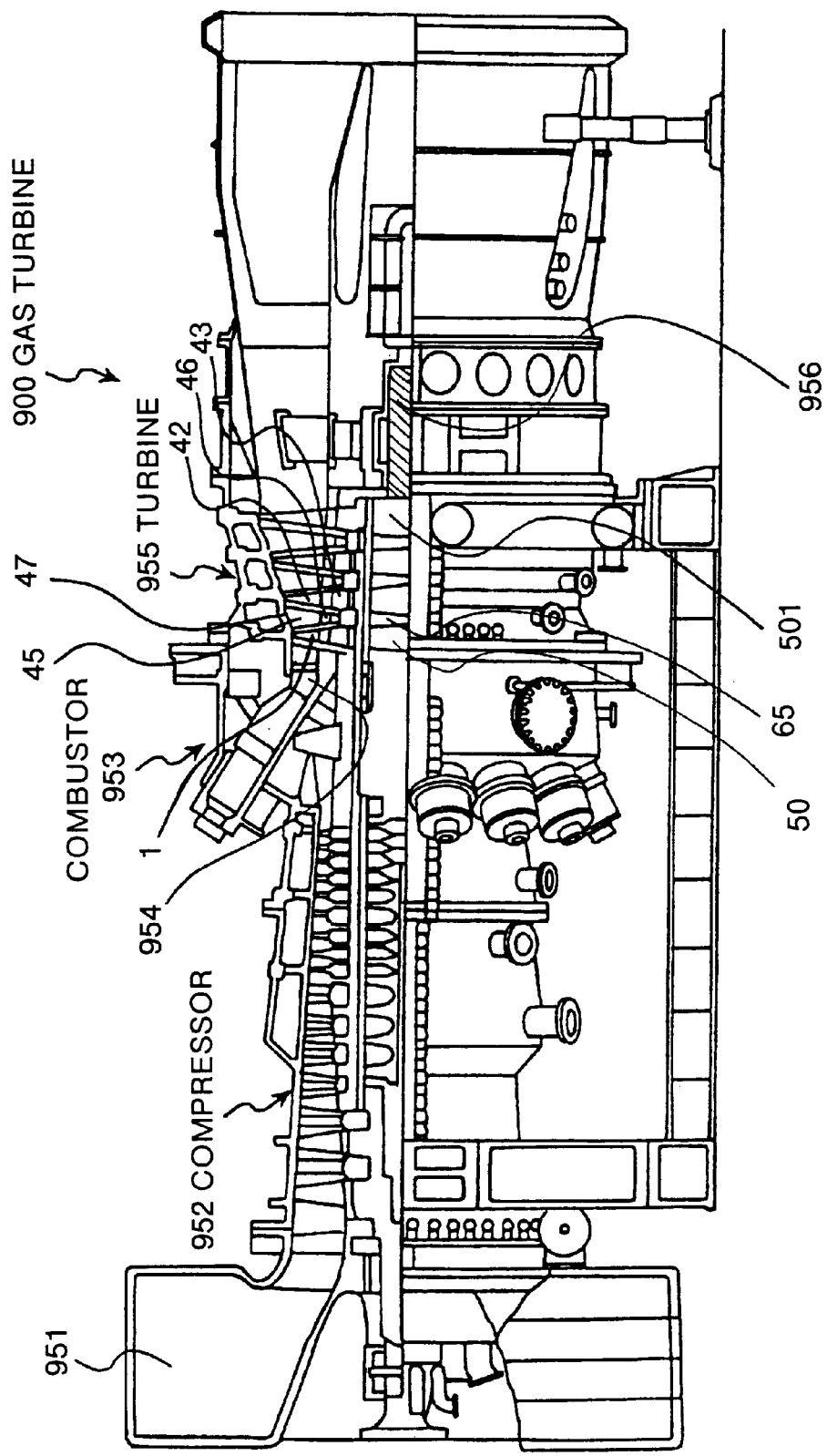
FIG. 1 is an explanatory diagram which shows a gas turbine according to a first embodiment of this invention.

FIG. 1 is an explanatory diagram which shows a gas turbine according to a first embodiment of this invention. The gas turbine 900 cools high-temperature members in the gas turbine, such as a dynamic blade, a rotor desk or a stationary blade, by steam. The air taken in from an air intake 951 is compressed by a compressor 952, to become high-temperature and high-pressure compressed air, and is fed to a combustor 953. In the combustor 953, a gas fuel such as a natural gas or a liquid fuel such as light fuel oil or light heavy fuel oil is supplied to the compressed air to burn the fuel, to thereby generate a high-temperature and high-pressure combustion gas. This high-temperature and high-pressure combustion gas is guided to a tail pipe 954 of the combustor, and injected to a turbine 955.

The stationary blade and the dynamic blade of the turbine 955 are cooled by steam. The steam that cools the dynamic blade 1 is supplied through a steam supply flow passage (not shown) provided in a main spindle 956 of the turbine. The steam supplied from this steam supply flow passage is guided to an outside steam supply pipe 60, provided in plural numbers in the peripheral direction of the rotor disk 50, with the direction thereof being changed by 90 degrees in front of the rotor disk 501, and is supplied to the dynamic blade 1. The steam supply pipe 60 provided in the rotor disk 50 and a cooling flow passage provided inside of the dynamic blade 1 are coupled by a tube seal explained below.

Figure 2:
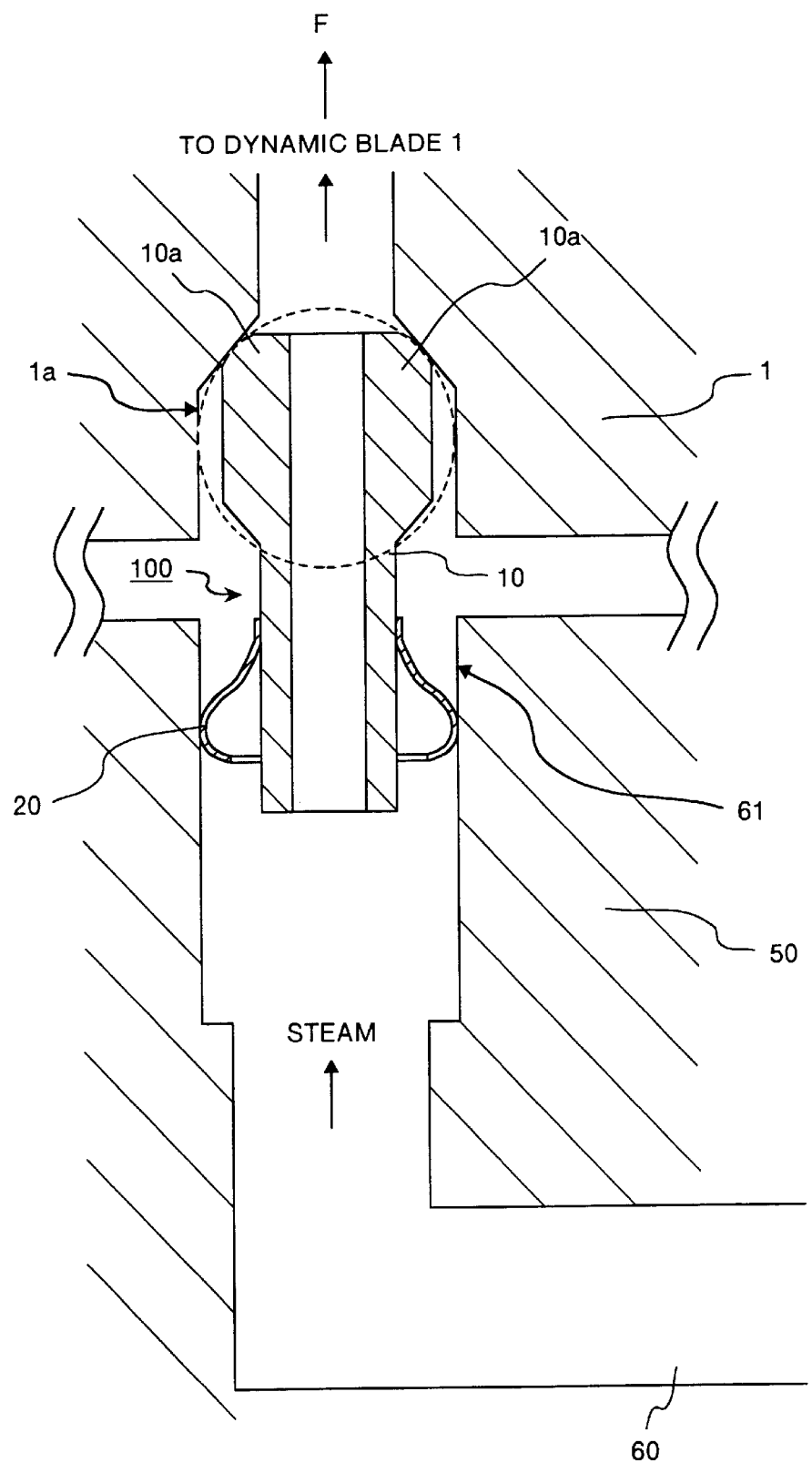
FIG. 2 is a cross section which shows a joint structure of a cooling passage which supplies cooling steam from the rotor disk side to the dynamic blade side or recovers it from the dynamic blade side to the rotor disk side, according to the first embodiment of this invention.

FIG. 2 is a cross section which shows the joint structure of the cooling passage which supplies cooling steam from the rotor disk side to the dynamic blade side or recovers it from the dynamic blade side to the rotor disk side, according to the first embodiment of this invention. For convenience of explanation, the structure on the steam supply side will be explained, the steam recovery side has the same structure. As shown in FIG. 2, a tube seal 100 is fitted with a spherical spring 20, which is an elastic member, at one end of a tubular barrel 10. Here, the temperature of the steam supplied from the steam supply pipe 60 is about 400° C., and hence it is desirable to manufacture the spherical spring 20 from a heat-resistant material, and as the material, for example, a heat-resistant alloy such as inconel can be used. The end where the spring 20 is fitted to the tubular barrel 10 is inserted into a steam supply pipe outlet 61, which is the coolant passage provided in the rotor disk 50. Here, since the outer diameter of the spherical spring 20 is smaller than the inner diameter of the steam supply pipe outlet 61, when the spherical spring 20 is inserted into the steam supply pipe outlet 61, the spherical spring 20 is pressed against the internal surface of the steam supply pipe outlet 61 by the elastic force thereof. As a result, leakage of the steam passing through between the internal surface of the steam supply pipe outlet 61 and the spherical spring 20 can be suppressed.

The other end 10a of the barrel 10 is formed into a spherical shape, and this end 10a is inserted into a steam supply port 1a in the dynamic blade 1, which is another coolant passage port, to thereby abut against the internal surface of the steam supply port 1a. Here, the steam supply port 1a is formed into a conical shape, such that the inner diameter of the portion abutting against the end 10a of the barrel 10 decreases towards the point of the dynamic blade 1, so that the conical portion is brought into line contact with the end 10a of the tube seal 100, which is formed into a spherical shape. During operation of the gas turbine, the rotor disk 50 and the dynamic blade 1 fitted there to rotate at a high speed, and centrifugal acceleration of from 2000 to 3000 g acts on the tube seal 100. By a centrifugal force F based on this centrifugal acceleration, the end 10a of the tube seal 100 formed into a spherical shape is pressed against the internal surface of the steam supply port 1a formed into a conical shape. As a result, leakage of steam between the end 10a of the tube seal 100 and the steam supply port 1a can be suppressed. Further, since the end 10a of the tube seal 100 is formed into a hemispherical shape, the tube seal 100 has high strength and can endure a large centrifugal force due to the high centrifugal acceleration.

Figure 9:
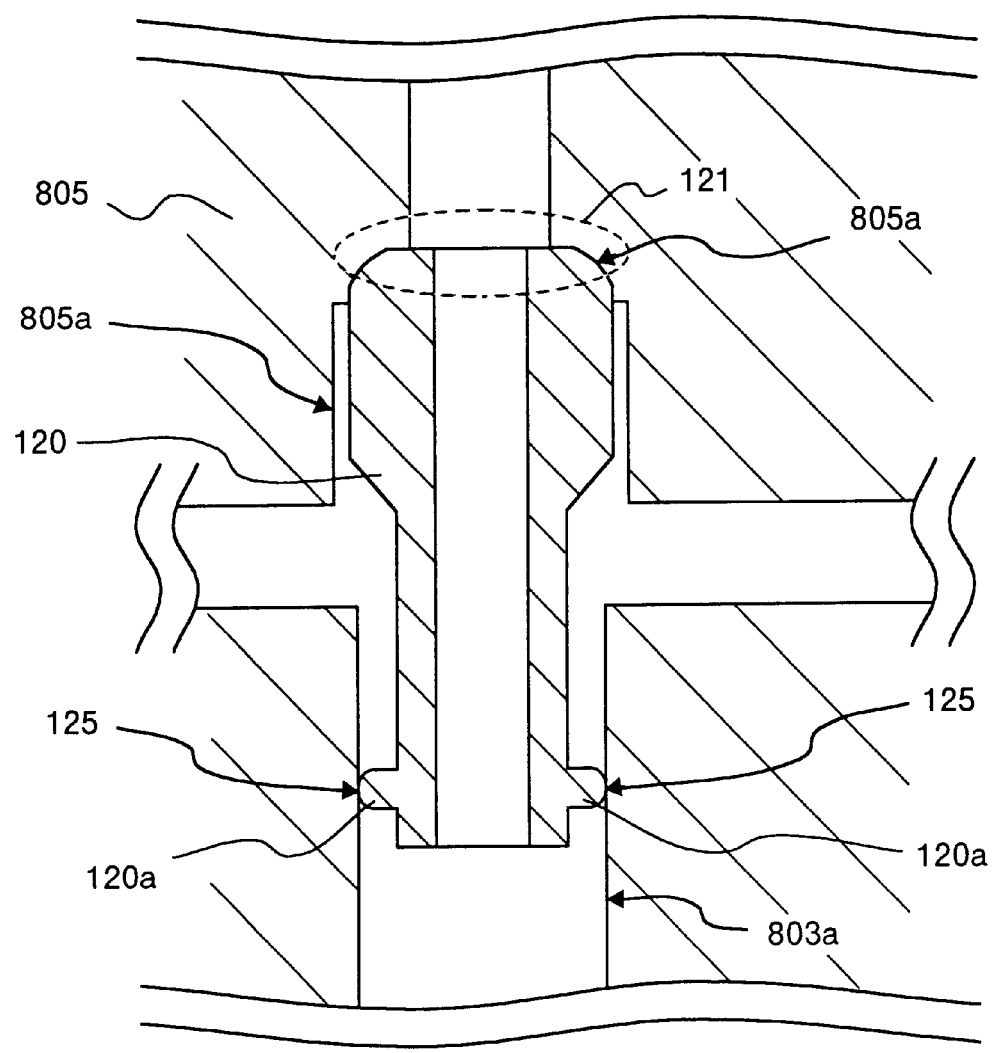
FIG. 9 is a cross section which shows a joint structure of the coolant passage, which has been conventionally used for supplying or recovering the cooling steam from the rotor disk side to the dynamic blade side.

With the conventional joint structure, since the end of the tube seal and the internal surface of the steam supply port are brought into face contact with each other (see FIG. 9), a high machining accuracy is necessary in order to obtain a certain sealing effect. However, since the end 10a of the tube seal 100 and the internal surface of the steam supply port 1a are brought into line contact with each other, sufficient sealing effect can be exhibited, without increasing the machining accuracy. It is difficult to manufacture the inner face of the steam support port into a spherical shape, but this steam support port has only to be manufactured into a conical shape, and hence manufacturing is easy, and manufacturing cost can be reduced by this.

The portion where the steam supply port 1a comes in contact with the end 10a of the tube seal 100, and the portion where the steam supply pipe outlet 61 comes in contact with the spherical spring 20 are preferably applied with hard facing coating. It is because, in this manner, fretting wear can be reduced, and the seal performance can be maintained for a long period of time. As the hard facing coating, there can be mentioned, for example, one in which a TiC layer or a TiN layer is physically formed by chrome plating or PVD (Physical Vapor Deposition). A high carbon and high chrome steel, a high manganese steel or Co—Cr—W alloy (Stellite) may be welded by hard facing processing, and used as the hard facing coating.

Figure 3:
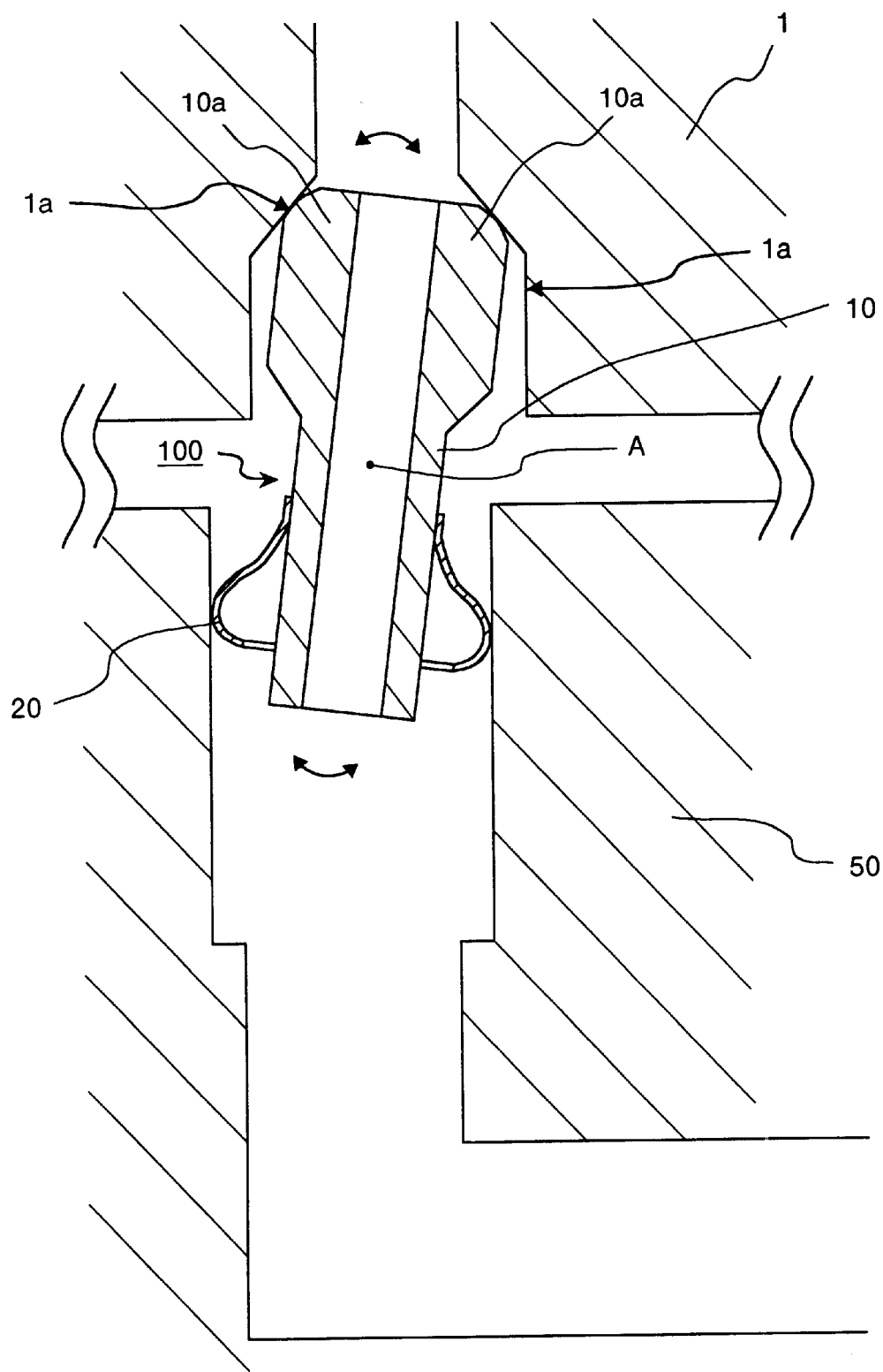
FIG. 3 is an explanatory diagram which shows the tube seal condition when the disk rotor and the dynamic blade are shifted from each other.

FIG. 3 is an explanatory diagram which shows the tube seal condition when the disk rotor and the dynamic blade are shifted from each other. During operation of the gas turbine, the dynamic blade 1 and the rotor disk 50 are thermally expanded, due to the influence of high-temperature combustion gas. However, due to a difference of expansion coefficient resulting from difference of materials, a shift as shown in FIG. 3 may occur.

The end 10a of the tube seal 100 according to the first embodiment is formed into a spherical shape. Therefore, even when the dynamic blade 1 is shifted vertically with respect to the axial direction of the tube seal 100, as shown in FIG. 3, the end 10a of the tube seal 100 can move while abutting against the internal surface of the steam supply port 1a. As a result, even if a shift occurs between the dynamic blade 1 and the rotor disk 50, leakage of steam between the end 10a of the tube seal 100 and the steam supply port 1a can be suppressed. On the other hand, since the spherical spring 20 is fitted to the other end of the tube seal 100, even if a shift occurs between the dynamic blade 1 and the rotor disk 50, the spherical spring 20 deforms to suppress leakage of steam in this portion.

When the dynamic blade 1 and the rotor disk 50 are shifted, the tube seal 100 absorbs this shift by rotating about a point A. Therefore, a shift larger than the gap caused between the tube seal 100 and the internal surface of the steam supply pipe outlet 61 provided in the rotor disk 50 can be absorbed. As described above, with the joint structure according to the first embodiment of this invention, even if the dynamic blade 1 and the rotor disk 50 are shifted largely from each other, leakage of steam can be suppressed, to thereby suppress wasteful consumption of steam.

Figure 4A:
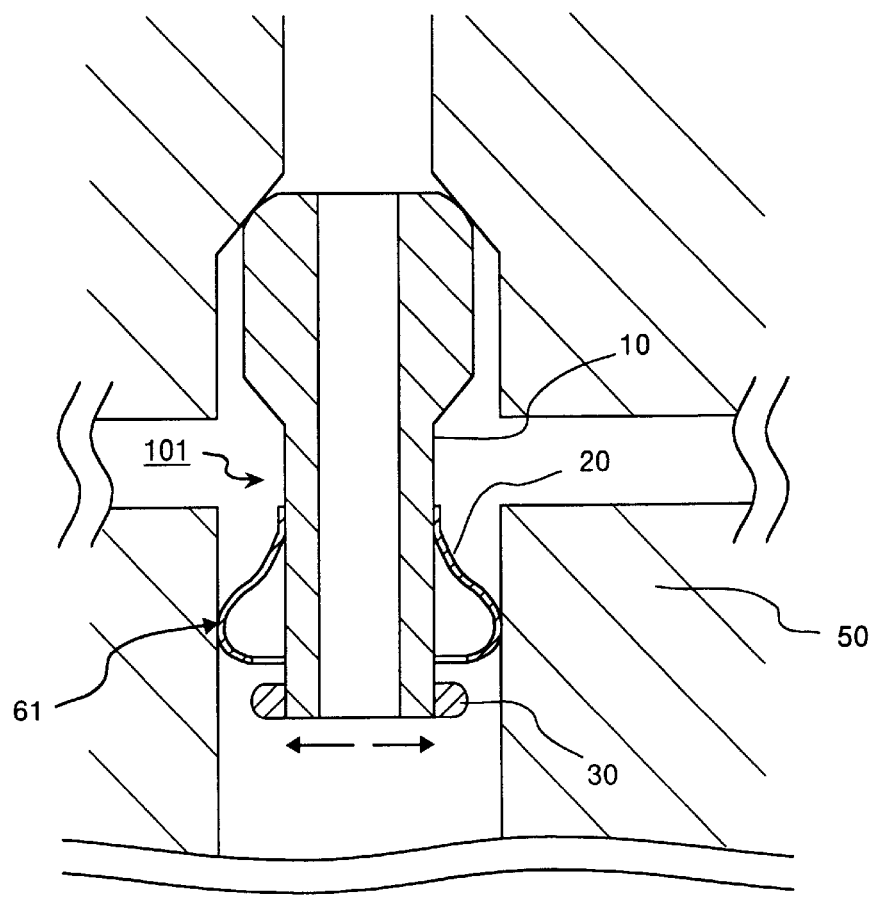
FIG. 4A to FIG. 4C are cross sections which show a modified example of the joint structure of the cooling passage according to the first embodiment.
Figure 4B:
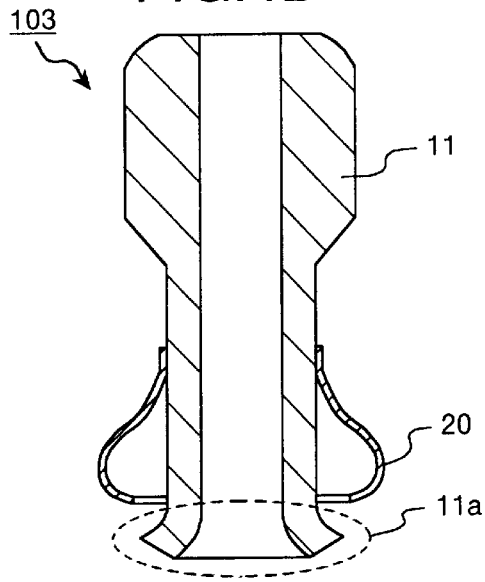
Figure 4C:
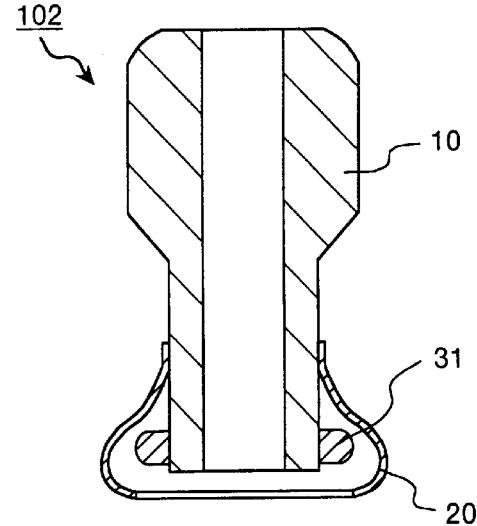

FIG. 4A to FIG. 4C are cross sections which show a modified example of the joint structure of the cooling passage according to the first embodiment. This joint structure is such that a protruding portion for restricting a radial movement of the tube seal is provided at the end of the tube seal on the side where a spherical elastic body is provided. As shown in FIG. 4A, a protruding portion 30 is formed at the end of a barrel 10 where a spherical spring 20 is fitted. Though it is not clear from FIG. 4A, this protruding portion 30 is formed by fitting an annular member in the outer periphery of the barrel 10 and fixing it by welding. The outer diameter of the protruding portion 30 is smaller than the inner diameter of the steam supply pipe outlet 61 provided in the rotor disk 50, so that this portion can be inserted in the steam supply pipe outlet 61.

When the dynamic blade 1 and the rotor disk 50 are shifted, the spherical spring 20 deforms to absorb this shift and ensure the seal performance. However, if a large deformation continues for a long period of time, the spherical spring 20 may be damaged. In this tube seal 101, a movement thereof in the direction perpendicular to the axial direction of the tube seal 101 is restricted by the protruding portion 30 provided at the end of the barrel 10. As a result, the amount of deformation of the spherical spring 20 can be suppressed to a certain value or below, and hence the burden of the spherical spring 20 can be reduced, and the damage thereof can be also suppressed to the minimum.

In the above explanation, the protruding portion 30 is formed by fitting the annular member to the barrel 10 of the tube seal 101, but as shown in FIG. 4B, the end 11a of the barrel 11 may be formed into a trumpet shape, to be used as the protruding portion. In this manner, since it is not necessary to provide a new part as the protruding portion, the number of parts can be reduced, and hence the manufacturing cost can be reduced. Further, since the protruding portion is formed integrally with the barrel 10, the durability can be increased. Since there is no risk of dropout, when it is assembled in the gas turbine, the reliability of the gas turbine itself is improved, enabling stable operation.

As shown in FIG. 4C, a protruding portion 31 may be formed on the outer periphery of the barrel 10 and inside of the spherical spring 20, by fitting an annular member thereto by welding or the like. In this manner, since the protruding portion 31 is formed inside of the spherical spring 20, the length of the portion inserted into the steam supply pipe outlet 61 provided in the rotor disk 50 can be made short, as compared with the tube seal 101 or 103. As shown in FIG. 3, when the dynamic blade 1 is shifted, the tube seal rotates about the point A to absorb this shift. At this time, if the portion inserted into the steam supply pipe outlet 61 is long, the end of the tube seal comes in contact with the internal surface of the steam supply pipe outlet 61, in the state with the angle of rotation being small, and the tube seal cannot rotate any more. However, as in the tube seal 102 shown in FIG. 4C, if the length of this portion is short, when the dynamic blade 1 is shifted, the tube seal 102 can rotate up to a larger angle of rotation. Therefore, even if the shift between the dynamic blade 1 and the rotor disk 50 is large, this shift can be absorbed. As a result, leakage of steam can be reduced to the minimum, to thereby suppress wasteful consumption of the steam.

Figure 5:
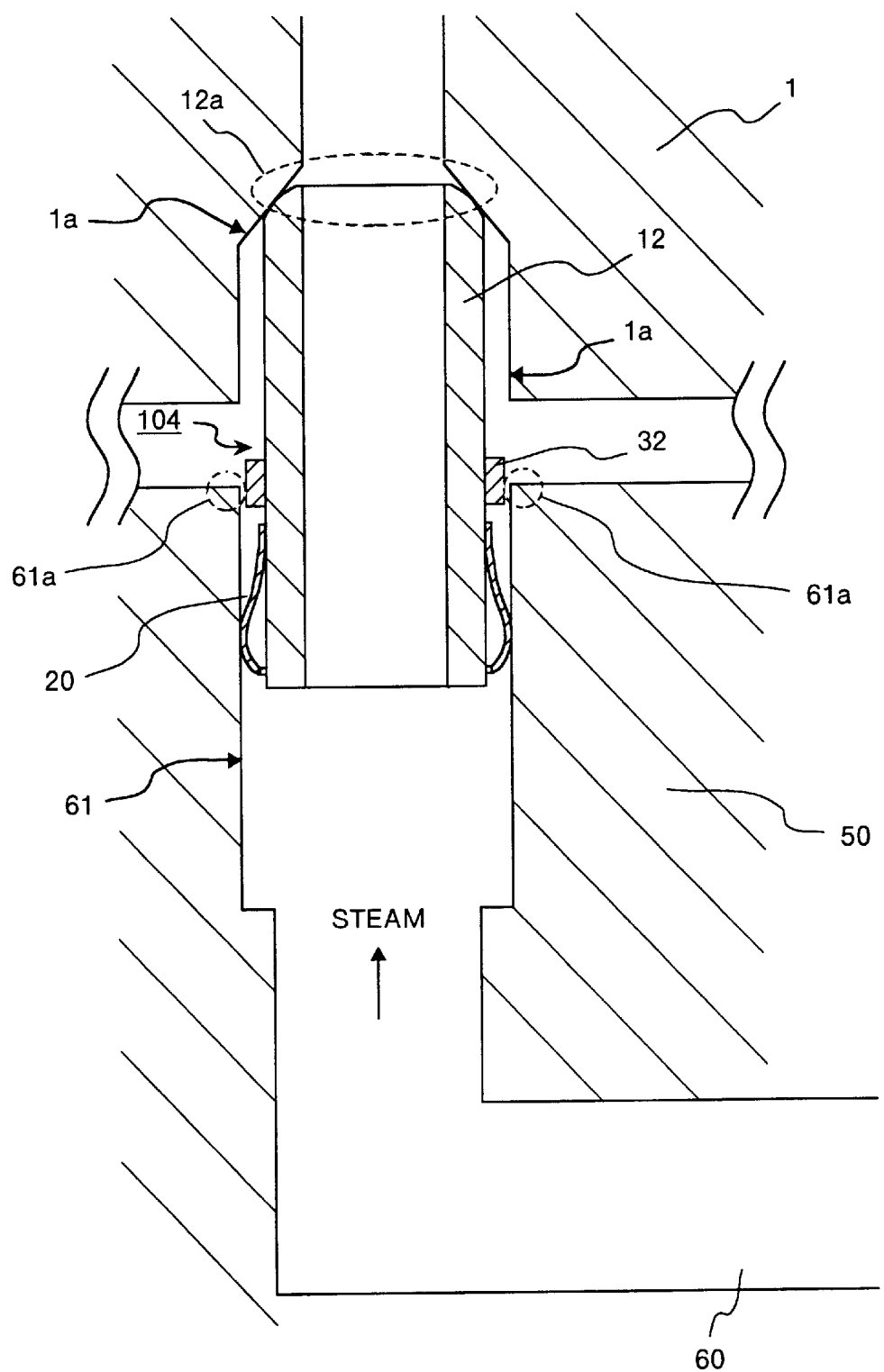
FIG. 5 is a cross section which shows a joint structure of a cooling passage which supplies cooling steam from the rotor disk side to the dynamic blade side or recovers it from the dynamic blade side to the rotor disk side, according to a second embodiment of this invention.

FIG. 5 is a cross section which shows a joint structure of a cooling passage, which supplies cooling steam from the rotor disk side to the dynamic blade side or recovers it from the dynamic blade side to the rotor disk side, according to a second embodiment of this invention. This joint structure is applicable when the shift between the dynamic blade 1 and the rotor disk 50 is small. When the dynamic blade 1 is shifted, a protruding portion 32 provided in a barrel 12 of a tube seal 101 abuts against an opening end 61a of a steam supply pipe outlet 61 provided in the rotor disk 50, to restrict this shift.

In this joint structure, a tube seal 104 having a tubular barrel 12 is used, and a curved surface is provided on the outer periphery of an end 12a of the barrel 12, so that this curved surface abuts against the internal surface of a steam supply port 1a in the dynamic blade 1. A protruding portion 32 which restricts a radial movement of the tube seal 104 is fitted on the side of the barrel 12 and at a position of the opening end 61a of the steam supply pipe outlet 61 provided in the rotor disk 50.

The end 12a of the barrel 12 may have a cut instead of the curved surface. Alternatively, this portion may be formed into a conical shape matched with the shape of the internal surface of the steam supply port 1a provided in the dynamic blade 1. However, either shape comes in face contact with the internal surface of the steam supply port 1a provided in the dynamic blade 1. Therefore, from a viewpoint of seal performance, it is desired to form a curved surface at the end 12a of the barrel 12.

Since the joint structure according to the second embodiment is applied when the shift of the dynamic blade 1 is not so large, the inclination of the tube seal when the dynamic blade 1 is shifted is small, as compared with the tube seal according to the first embodiment (see FIG. 2 to FIG. 4C). Therefore, as in the tube seal according to the first embodiment, it is not necessary to form the portion abutting against the steam supply port 1a provided in the dynamic blade 1 into a spherical shape, and only by providing a curved surface on the outer periphery of the end 12a, the shift of the dynamic blade 1 can be sufficiently absorbed.

When the dynamic blade 1 is shifted, the protruding portion 32 formed on the barrel 12 of the tube seal 104 abuts against the opening end 61a of the steam supply pipe outlet 61 provided in the rotor disk 50. Thereby, the radial movement of the tube seal 104 is restricted, and hence damage of the spherical spring 20 can be also prevented. Further, since the curved surface provided at the end 12a of the barrel 12 comes in line contact with the internal surface of the steam supply port 1a provided in the dynamic blade 1, leakage of steam in this portion can be suppressed.

Though this tube seal 104 has a limitation of being applied when the shift of the dynamic blade 1 is small, the structure of the tube seal 104 is simple, and it can be manufactured only by machining the tube. Hence, there is an advantage in that manufacturing is quite easy, as compared with the tube seal according to the first embodiment. As a result, when it is known that the shift of the dynamic blade 1 is small, the manufacturing cost of the gas turbine or the like can be reduced by applying this tube seal 104.

Figure 6A:
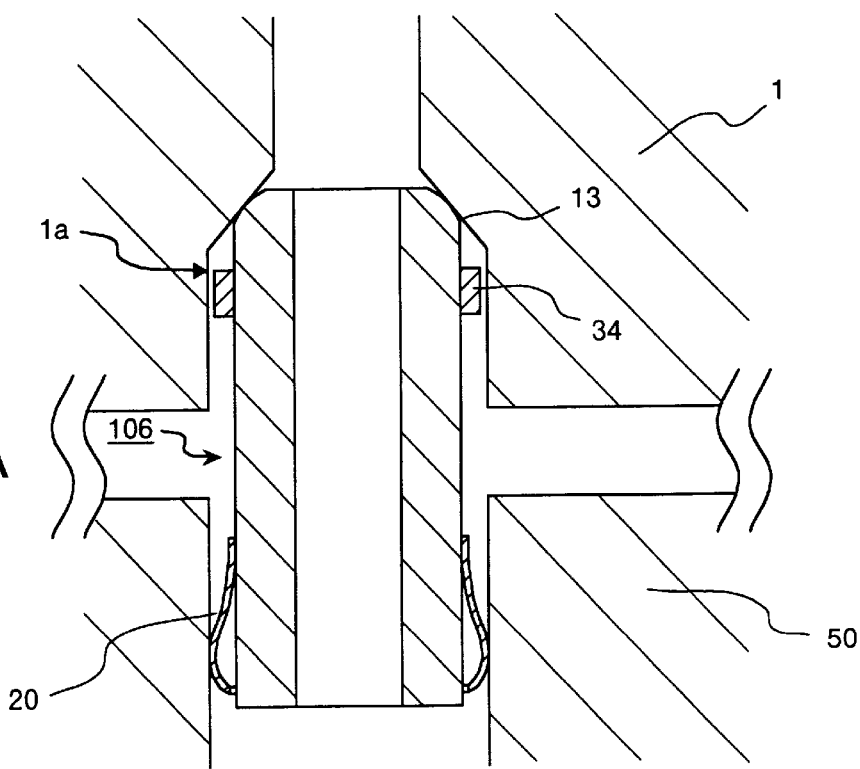
FIG. 6A and FIG. 6B are cross sections which show another example of the joint structure according to the second embodiment.
Figure 6B:
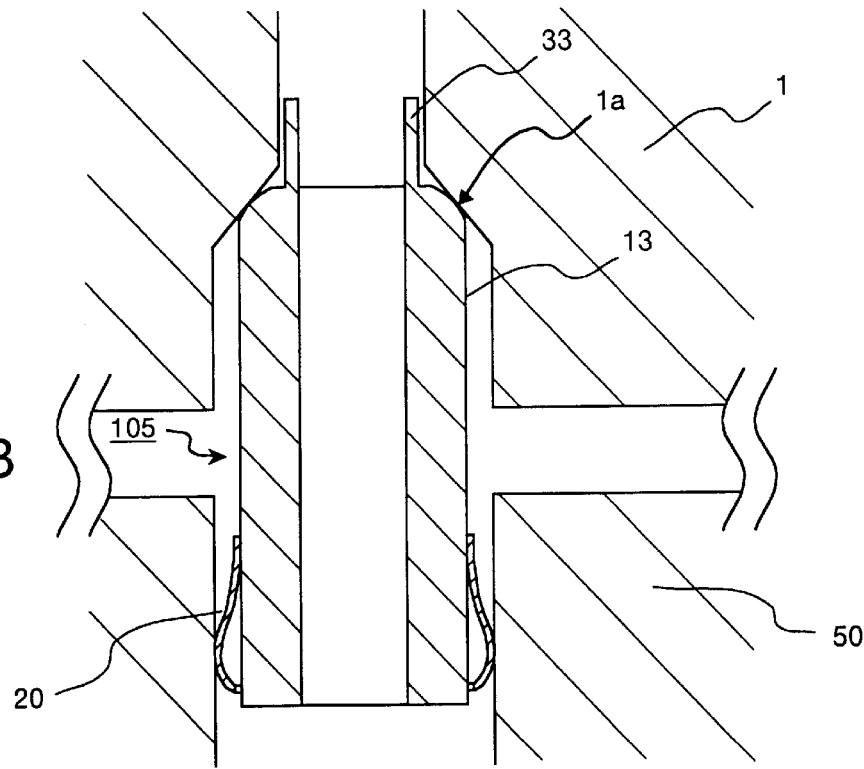

FIG. 6A and FIG. 6B are cross sections which show another example of the joint structure according to the second embodiment. As shown in FIG. 6A, a protruding portion 34 may be formed on the side of a barrel 13, and at a position inside of the steam supply port 1a provided in the dynamic blade 1, by fitting an annular member thereto, so that this portion abuts against the internal surface of the steam supply port 1a, to thereby restrict a radial movement of a tube seal 106. Further, as shown in FIG. 6B, a tubular member 33 may be provided at the point of the barrel 13, and this is inserted into the steam supply port 1a provided in the dynamic blade 1, and this tubular member 33 comes in contact with the inside of the steam supply port 1a, to thereby restrict an axial movement of a tube seal 105.

Figure 7:
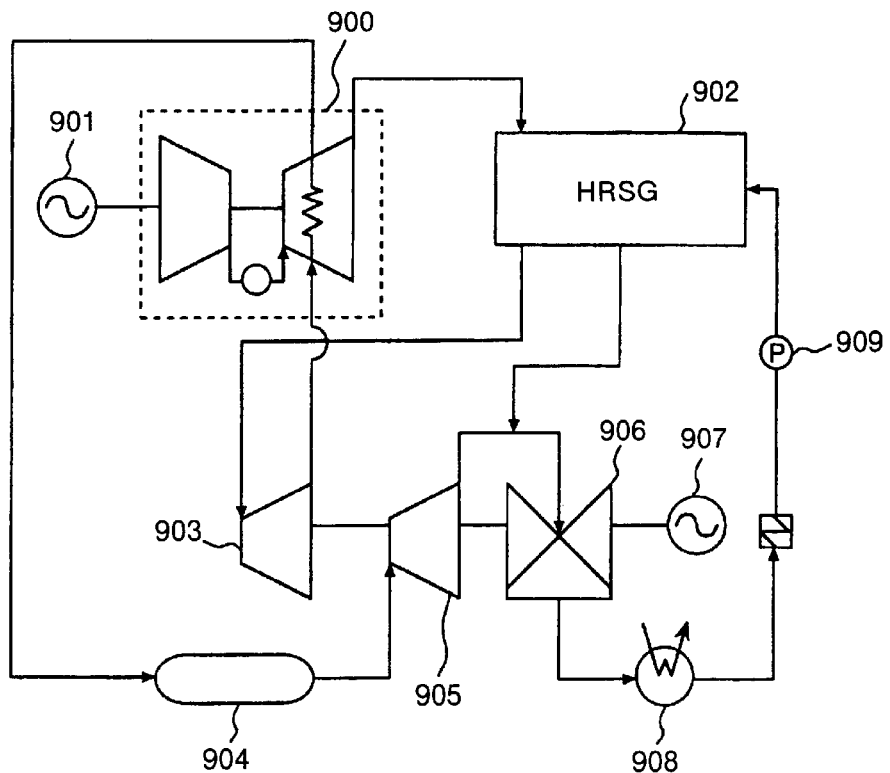
FIG. 7 is a schematic diagram which shows a gas turbine composite electric generating plant adopting steam cooling for hot sections.
Figure 8:
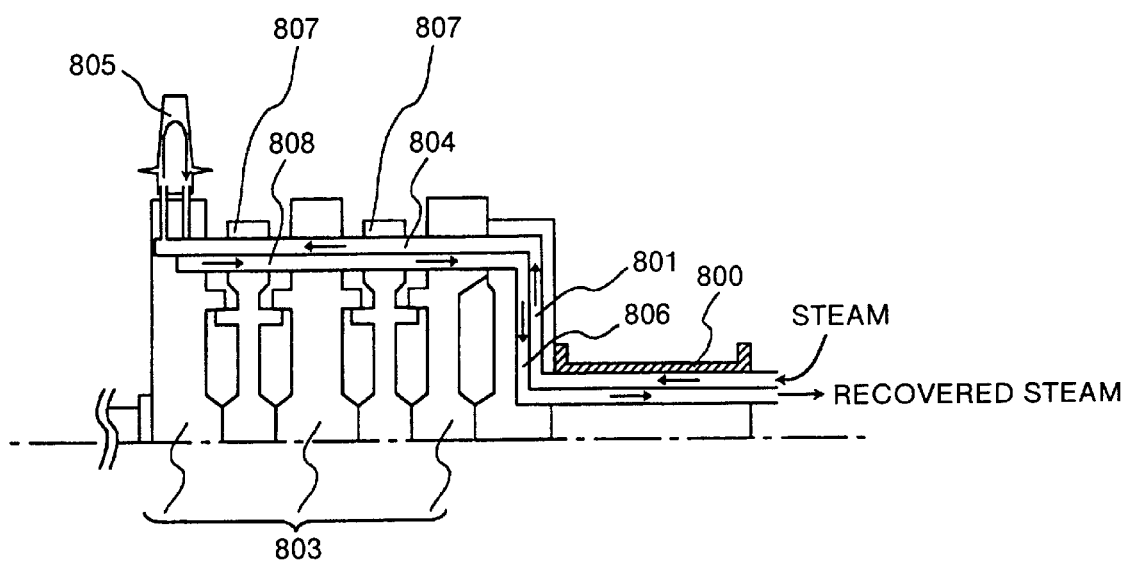
FIG. 8 is a cross section which shows a steam flow passage for supplying cooling steam to the dynamic blade of the turbine.

FIG. 7 is a schematic diagram which shows a gas turbine composite electric generating plant adopting steam cooling for hot sections. In this gas turbine composite electric generating plant, thermal energy contained in the exhaust gas in the gas turbine is recovered by an HRSG (Heat Recovery Steam Generator). Steam is generated by the thermal energy in the recovered exhaust gas in the gas turbine, and a steam turbine is driven by this high-temperature and high-pressure steam, to generate power by the generator coupled thereto. As described above, in the gas turbine composite electric generating plant, the exhaust heat in the gas turbine can be effectively utilized, and as a result, thermal efficiency of the whole plant can be increased.

This gas turbine 900 uses steam for cooling hot members such as a dynamic blade and a rotor disk. Though not clear from FIG. 7, the sealing structure of cooling steam explained in the first to the third embodiments is applied to a steam supply channel provided in the rotor disk. The gas turbine 900 is coupled to a first generator 901, and the gas turbine 900 drives the first generator 901 to generate power. The exhaust gas in the gas turbine 900 has still a temperature of about several hundreds degrees, and hence this exhaust gas is guided to the HRSG 902, to generate steam.

The steam generated in the HRSG 902 is first guided to a high pressure steam turbine 903, to drive it. The exhaust steam of the high pressure steam turbine 903 is guided to the gas turbine 900 and used for cooling hot members such as a dynamic blade and a stationary blade. The steam having cooled the hot member in the gas turbine 900 is guided to a mixing chamber 904, and then supplied to an intermediate pressure steam turbine 905. The steam having driven the intermediate pressure steam turbine 905 is supplied to a low pressure steam turbine 906 to drive it. The high pressure steam turbine 903, the intermediate pressure steam turbine 905 and the low pressure steam turbine 906 are serially connected, so as to rotate a second generator 907 connected to the output axis of these to thereby generate power.

The steam having driven the intermediate pressure steam turbine 905 and the low pressure steam turbine 906 is recovered to the water form by a steam condenser 908, and thereafter is supplied again to the HRSG 902 by a pump 909. After the water is changed into steam again by an evaporator (not shown) provided in the HRSG 902, the steam is heated by a superheater (not shown) and supplied to the high pressure steam turbine 903 again, and repeating the above process.

In this gas turbine composite electric generating plant, the gas turbine 900 having the seal structure of the cooling steam comprising the tube seal and the rotor disk explained in the first to third embodiments is used. Therefore, cooling steam can be reliably supplied to the dynamic blade, and trip of the gas turbine 900 is suppressed, thereby enabling stable operation. As a result, the reliability of the electric generating plant is increased. Further, since reliable seal is possible, leakage of steam is also reduced, and hence valuable steam can be effectively utilized, and thermal efficiency of the whole composite plant can be improved by this.

As described above, the joint structure of the cooling flow passage in the gas turbine in this invention brings the spherically formed end of the tube seal and the internal surface of the coolant passage port provided at the root of the dynamic blade into line contact with each other, to thereby suppress leakage of the coolant in this portion. At the coolant passage port on the rotor disk side, leakage of steam is suppressed by the spherical spring provided on the tube seal barrel. Since the coolant passage port provided in the dynamic blade and the end of the tube seal barrel are brought into line contact with each other, leakage of the coolant can be suppressed, even if the machining accuracy in this portion is not so high. Further, since the end of the tube seal is formed into a spherical shape, even if the dynamic blade is shifted and the tube seal is inclined, the end of the tube seal can follow this inclination to maintain the line contact. As a result, even if the dynamic blade is shifted, sealing effect can be maintained.

The joint structure of the cooling flow passage in the gas turbine according to this invention allows the spherically formed end of the tube seal barrel to abut against the coolant passage port, whose inner surface provided in the dynamic blade being formed into a conical shape, to thereby suppress leakage of the coolant in this portion. At the coolant passage port on the rotor disk side, leakage of steam is suppressed by the spherical spring provided on the tube seal barrel. Therefore, the seal performance can be maintained, regardless of the operation condition, to thereby suppress the amount of coolant such as steam or air leaking from the joint portion of the cooling flow passage. Hence, the coolant can be effectively utilized to improve the thermal efficiency of the gas turbine. Further, since the coolant passage provided at the root of the dynamic blade is formed into a conical shape, machining is easy, and much labor is not needed for manufacturing.

The joint structure of the cooling flow passage in the gas turbine according to this invention restricts a radial movement of the tube seal in the above tube seal, by being provided with the protruding portion on the side of the tube seal barrel so that the protruding portion abuts against the coolant passage port provided in the rotor disk. By this action, the deformation of the elastic member provided on the tube seal barrel is restricted, and thence damage of this elastic member can be suppressed. As a result, with this joint structure, leakage of the coolant can be suppressed more reliably, thereby increasing the reliability. Further, since the durability of the tube seal also increases, labor for maintenance and checking can be reduced.

In the joint structure of the cooling flow passage in the gas turbine according to this invention, leakage of the coolant is suppressed by abutting the working face formed on the outer periphery of the end of the tube seal barrel against the internal surface of the coolant passage port, whose inner face provided in the dynamic blade is formed into a conical shape. Further, leakage of the coolant in the coolant passage port provided in the rotor disk is suppressed by the elastic member. The radial movement of the tube seal is also restricted by the protruding portion provided in the tube seal barrel, to thereby prevent the elastic member from being damaged. This joint structure serves the function effectively, when the shift between the dynamic blade and the rotor disk is small. Further, since it is not necessary to form the end of the tube seal used in this joint structure into a spherical shape, manufacturing is easy, and the manufacturing cost can be reduced.

In the tube seal of this invention, since the end thereof is formed into a spherical shape, even if a large force acts thereon in the axial direction of the tube seal, it can endure the force to maintain the seal performance. Since the elastic member which deforms in the radial direction of the tube seal barrel is provided, the seal performance can be also ensured. Even when the tube seal inclines, the seal performance can be maintained by the spherical end and the elastic member. Therefore, even in a portion where the shift of the tube seal with respect to the radial direction is large, the sealing effect can be exhibited.

In the tube seal of this invention, since the deformation of the elastic member is suppressed to a certain value or below by the protruding portion provided on the barrel, a damage of the elastic member can be suppressed, and the sealing effect can be reliably exhibited. Further, since the life of the elastic member becomes long, it can be used even for a structure that cannot be easily disassembled after the assembly.

The gas turbine of this invention has a configuration such that the rotor disk and the dynamic blade are connected by the above-described joint structure of the cooling flow passage, so as to supply or recover the coolant to or from the dynamic blade. Therefore, even under an environment in which a high centrifugal force acts under high temperatures, stable sealing effect can be exhibited. As a result, even under such an environment, wastage of the coolant can be made minimum, and the thermal efficiency of the gas turbine can be improved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A joint structure of a coolant passage in a gas turbine comprising:
   a rotor disk having a first coolant passage port configured to supply or to recover a coolant to or from a dynamic blade, the dynamic blade being fitted to an outer periphery of the rotor disk;
   a second coolant passage port provided at a root of the dynamic blade; and
   a tube seal having a tubular barrel, an end of the barrel having a spherical shape inserted into the second coolant passage port, and a side of the barrel having an elastic member configured to deform in a radial direction of the barrel inserted into the first coolant passage port,
   wherein an internal surface of the second coolant passage port and the spherical end of the tubular barrel come in line contact with each other.

2. The joint structure according to claim 1, wherein the tube seal comprises a protruding portion on the side of the barrel inserted into the first coolant passage port, an outer diameter of the protruding portion being larger than that of the barrel and smaller than that of the elastic member.

3. A joint structure of a coolant passage in a gas turbine comprising:
   a rotor disk having a first coolant passage port configured to supply or to recover a coolant to or from a dynamic blade, the dynamic blade being fitted to an outer periphery of the rotor disk;

a second coolant passage port provided at a root of the dynamic blade, the second coolant passage port having an internal surface that is conical and that tapers towards a tip of the dynamic blade; and a tube seal having a tubular barrel, an end of the barrel having a spherical shape inserted into the second coolant passage port, and a side of the barrel having an elastic member configured to deform in a radial direction of the barrel inserted into the first coolant passage port.

4. The joint structure according to claim 3, wherein the tube seal comprises a protruding portion on the side of the barrel inserted into the first coolant passage port, an outer diameter of the protruding portion being larger than that of the barrel and smaller than that of the elastic member.

5. A joint structure of a coolant passage in a gas turbine comprising:

a rotor disk having a first coolant passage port configured to supply or to recover a coolant to or from a dynamic blade, the dynamic blade being fitted to an outer periphery of the rotor disk;

a second coolant passage port provided at a root of the dynamic blade, the second coolant passage port having an internal surface that is conical and that tapers towards a tip of the dynamic blade; and a tube seal having a tubular barrel, a working face formed on an outer periphery of an end of the barrel inserted into the second coolant passage port, a side of the barrel having an elastic member configured to deform in a radial direction of the barrel inserted into the first coolant passage port, and a protruding portion provided on the side of the barrel configured to restrict a radial movement of the barrel by abutting against at least one of internal surfaces of the first and the second coolant passage ports.

6. A tube seal having a tubular barrel an end of which is formed into a spherical shape, and a side of the barrel configured to be inserted into a coolant passage port provided with an elastic member configured to deform in a radial direction of the barrel.

7. The tube seal according to claim 6, wherein the tube seal comprises a protruding portion on the side of the barrel configured to be inserted into the coolant passage port, an outer diameter of the protruding portion being larger than that of the barrel and smaller than that of the elastic member.

8. A gas turbine comprising:

a compressor configured to compress air to produce combustion air;

a combustor configured to supply a fuel to the combustion air produced by the compressor to generate a combustion gas; and a turbine having a joint structure of a coolant passage, the joint structure comprising:

a rotor disk having a first coolant passage port configured to supply or to recover a coolant to or from a dynamic blade, the dynamic blade being fitted to an outer periphery of the rotor disk;

a second coolant passage port provided at a root of the dynamic blade; and a tube seal having a tubular barrel, an end of the barrel having a spherical shape inserted into the second coolant passage port, and a side of the barrel having an elastic member configured to deform in a radial direction of the barrel inserted into the first coolant passage port, wherein an internal surface of the second coolant passage port and the spherical end of the tubular barrel come in line contact with each other.

9. A gas turbine comprising:

a compressor configured to compress air to produce combustion air;

a combustor configured to supply a fuel to the combustion air produced by the compressor to generate a combustion gas; and a turbine having a joint structure of a coolant passage, the joint structure comprising:

a rotor disk having a first coolant passage port configured to supply or to recover a coolant to or from a dynamic blade, the dynamic blade being fitted to an outer periphery of the rotor disk;

a second coolant passage port provided at a root of the dynamic blade, the second coolant passage port having an internal surface that is conical and that tapers towards a tip of the dynamic blade; and a tube seal having a tubular barrel, an end of the barrel having a spherical shape inserted into the second coolant passage port, and a side of the barrel having an elastic member configured to deform in a radial direction of the barrel inserted into the first coolant passage port.

10. A gas turbine comprising:

a compressor configured to compress air to produce combustion air;

a combustor configured to supply a fuel to the combustion air produced by the compressor to generate a combustion gas; and a turbine having a joint structure of a coolant passage, the joint structure comprising:

a rotor disk having a first coolant passage port configured to supply or to recover a coolant to or from a dynamic blade, the dynamic blade being fitted to an outer periphery of the rotor disk;

a second coolant passage port provided at a root of the dynamic blade, the second coolant passage port having an internal surface that is conical and that tapers towards a tip of the dynamic blade; and a tube seal having a tubular barrel, a working face formed on an outer periphery of an end of the barrel inserted into the second coolant passage port, a side of the barrel having an elastic member configured to deform in a radial direction of the barrel inserted into the first coolant passage port,and a protruding portion provided on the side of the barrel configured to restrict a radial movement of the barrel by abutting against at least one of internal surfaces of the first and the second coolant passage ports.

* * * * *